US011153738B2

(12) United States Patent
Gundavelli et al.

(10) Patent No.: US 11,153,738 B2
(45) Date of Patent: Oct. 19, 2021

(54) EXTENDING CELL BROADCAST NOTIFICATION TO OTHER COMMUNICATION TECHNOLOGIES

(71) Applicant: Cisco Technology, Inc., San Jose, CA (US)

(72) Inventors: Srinath Gundavelli, San Jose, CA (US); Indermeet Singh Gandhi, Bangalore (IN); Shree N. Murthy, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 16/677,071

(22) Filed: Nov. 7, 2019

(65) Prior Publication Data
US 2021/0144538 A1 May 13, 2021

(51) Int. Cl.
H04W 4/90 (2018.01)
H04M 7/00 (2006.01)
H04W 16/26 (2009.01)
H04W 76/16 (2018.01)
H04W 76/50 (2018.01)
H04W 4/021 (2018.01)
(Continued)

(52) U.S. Cl.
CPC .............. H04W 4/90 (2018.02); G08B 25/10 (2013.01); H04M 7/006 (2013.01); H04W 4/021 (2013.01); H04W 4/029 (2018.02); H04W 4/06 (2013.01); H04W 16/26 (2013.01); H04W 76/16 (2018.02); H04W 76/50 (2018.02); H04W 84/042 (2013.01); H04W 84/12 (2013.01)

(58) Field of Classification Search
CPC ......... H04W 4/90; H04W 4/021; H04W 4/06; H04W 76/50; H04W 16/26; H04W 4/029; H04W 76/16; H04W 84/042; H04W 84/12; H04M 7/006; G08B 25/10
USPC ................ 455/404.1, 414.1, 456.1–457, 521
See application file for complete search history.

(56) References Cited

U.S. PATENT DOCUMENTS

2006/0206568 A1* 9/2006 Verma ............... H04L 29/12783
709/206
2009/0247111 A1* 10/2009 Sennett ................... H04W 4/90
455/404.1

(Continued)

OTHER PUBLICATIONS

3GPP, "3rd Generation Partnership Project; Technical Specification Group Services and System Aspects; Public Warning System (PWS) requirements (Release 16)", 3GPP TS 22.268 V16.3.0, Jun. 2019, 21 pages.

(Continued)

Primary Examiner — Michael Y Mapa
(74) Attorney, Agent, or Firm — Edell, Shapiro & Finnan, LLC

(57) ABSTRACT

Methods for extending cell broadcast notifications to various access technologies and enterprise communication infrastructure. A method includes obtaining, by a controller, a cellular broadcast message of a public warning system and identifying, by the controller, at least one network entity, from among a plurality of network entities operating in a private radio network, based on the at least one network entity being within a location area specified in the cellular broadcast message. The method further includes providing, by the controller to the at least one network entity, the cellular broadcast message.

8 Claims, 6 Drawing Sheets

(51) Int. Cl.
*H04W 4/029* (2018.01)
*H04W 4/06* (2009.01)
*G08B 25/10* (2006.01)
*H04W 84/12* (2009.01)
*H04W 84/04* (2009.01)

(56) References Cited

U.S. PATENT DOCUMENTS

2017/0069189 A1* 3/2017 Corum .................. H02J 50/80
2020/0162929 A1* 5/2020 Cimpu ............... H04W 52/367
2020/0213831 A1* 7/2020 Tjandra ............... H04W 12/08

OTHER PUBLICATIONS

ETSI, "Universal Mobile Telecommunications System (UMTS); LTE; Cell Broadcast Centre interfaces with the Evolved Packet Core; Stage 3 (3GPP TS 29.168 version 14.1.0 Release 14)", ETSI TS 129 168 V14.1.0, Oct. 2017, 50 pages.
Cisco, "Cisco Aironet Active Sensor Date Sheet", Document ID:1517281506592105, https://www.cisco.com/c/en/us/products/collateral/wireless/aironet-active-sensor/nb-09-air-act-sen-data-sheet-cte-en.html, Feb. 18, 2019, 11 pages.
Federal Communications Commission, "Emergency Communications", https://www.fcc.gov/consumers/guides/emergency-communications, Mar. 28, 2018, 7 pages.
Wikipedia, "First Responder Network Authority", https://en.wikipedia.org/wiki/First_Responder_Network_Authority, Jul. 17, 2019, 4 pages.
ETSI, "Universal Mobile Telecommunications System (UMTS)", LTE; Cell Broadcast Centre interfaces with the Evolved Packet Core; Stage 3, 3GPP TS 29.168 version 12.9.0 Release 12, ETSI TS 129 168 V12.9.0, Jan. 2016, 48 pages.
ETSI, "5G; Systems Architecture for the 5G System", 3GPP TS 23.501 version 15.2.0 Release 15, ETSI TS 123 501 V15.2.0, Jun. 2018, 219 pages.
ETSI, "5G; Procedures for the 5G System", 3GPP TS 23.502 version 15.2.0 Release 15, ETSI TS 123 502 V15.2.0, Jun. 2018, 311 pages.
ETSI, "5G; System Architecture for the 5G System", 3GPP TS 23.501 version 15.3.0 Release 15, ETSI TS 123 501 V15.3.0, Sep. 2018, 227 pages.
ETSI, "Universal Mobile Telecommunications System (UMTS); LTE; Cell Broadcast Centre interfaces with the Evolved Packet Core; Stage 3", 3GPP TS 29.168 version 15.1.0 Release 15, ETSI TS 129 168 V15.1.0, Sep. 2018, 56 pages.

* cited by examiner

EXTENDING CELL BROADCAST NOTIFICATION TO OTHER COMMUNICATION TECHNOLOGIES

TECHNICAL FIELD

The present disclosure relates to interworking between various communication technology architectures.

BACKGROUND

There are many regions in the world that are susceptible to natural disasters such as earthquakes, tsunamis, floods, volcanoes, and landslides. Such disasters can cause significant damage to property and cause human loss. In an effort to alleviate such loss, warning systems have been implemented and have proven to be effective in keeping people apprised of emergency situations. As one example, the wireless infrastructure has been leveraged to promulgate warnings. Third Generation Partnership Project (3GPP) and European Telecommunications Standards Institute (ETSI) standards groups have defined one such Public Warning System (PWS) under the 3GPP Technical Specification (TS) § 29.168 and § 22.268, which define key protocol interfaces and the communication mechanism to provide these warnings. Similarly, Cell Broadcast/Cell Information (CB) messaging is part of the 2G, 3G, 4G LTE, and 5G standards. It is also known as the Short Message Service-Cell Broadcast (SMS-CB). CB is designed for simultaneous delivery of a warning message to multiple users in a specified area. The PWS solution from the 3GPP has proved to be quite effective for delivering warning messages to devices that are connected to the macro-cell network. In a typical implementation, mobile network operators (MNOs) map a notification area of the received warning message to their cell locations and deliver the message to subscribers currently attached to those cells.

DESCRIPTION OF EXAMPLE EMBODIMENTS

Overview

Figure 1:
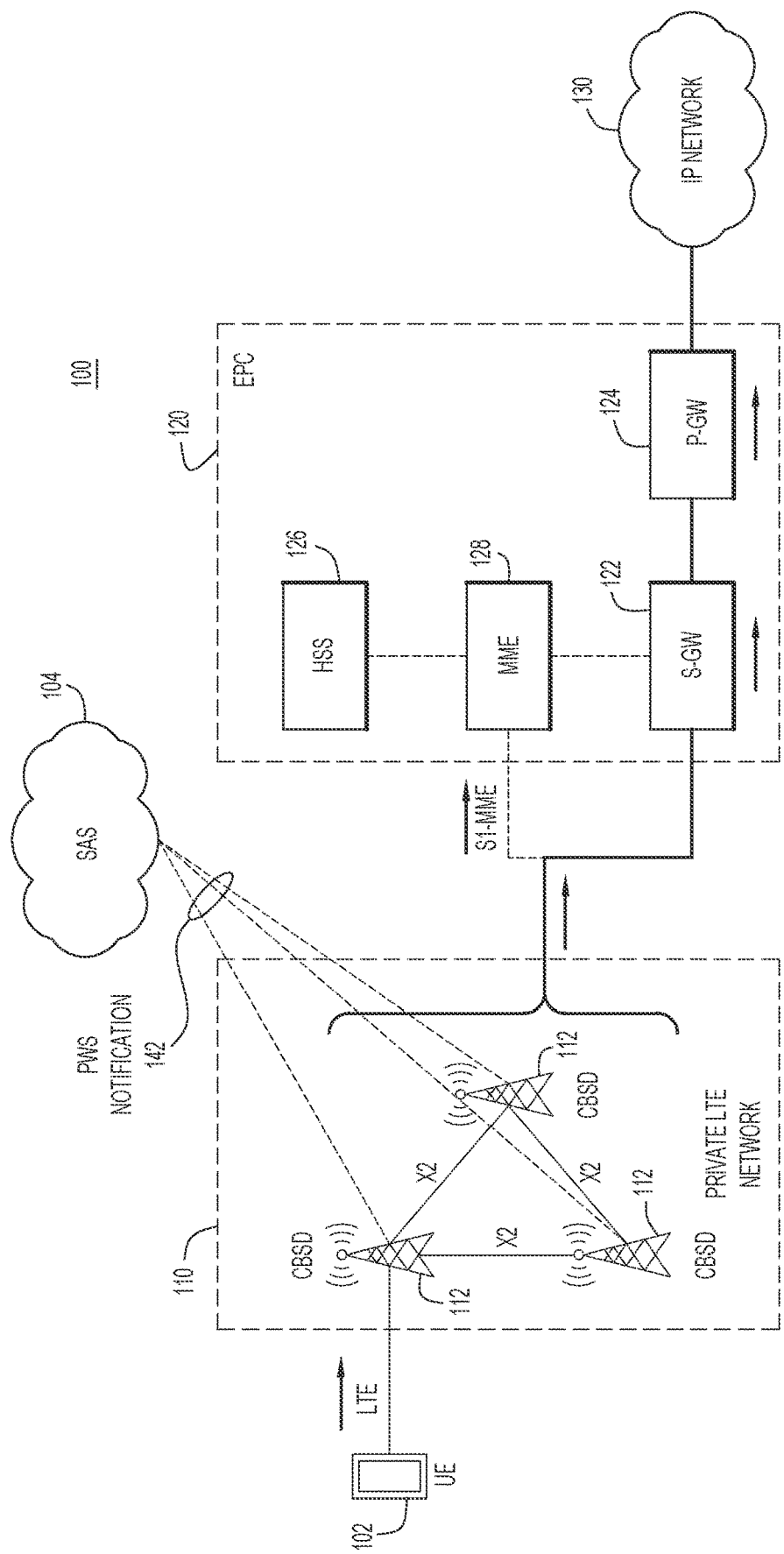
FIG. 1 is a block diagram illustrating an environment in which cell broadcast notifications are provided to a private radio network, according to an example embodiment.

Briefly, methods for extending cellular broadcast notification to a private radio network are provided. In these methods, a controller obtains a cellular broadcast message of a public warning system, identifies at least one network entity, from among a plurality of network entities operating in a private radio network, based on the at least one network entity being within a location area specified in the cellular broadcast message, and provides, to the at least one network entity, the cellular broadcast message.

Additionally, methods for extending cellular broadcast notification to an enterprise network are provided. In these methods, an enterprise controller obtains a cellular broadcast message of a public warning system, selects at least one enterprise communication tool from among a plurality of enterprise communication tools. For each of the at least one enterprise communication tool, the enterprise controller identifies at least one device associated with a respective enterprise communication tool, based on location information specified in the cellular broadcast message. The enterprise controller provides to the at least one device, the cellular broadcast message, via the respective enterprise communication tool.

Additionally, method for extending cellular broadcast notification via a network device are provided. In these methods, a device measures radio performance in a cellular network, receives a cellular broadcast message of a public warning system, and provides to at least one of an enterprise application executed by a software domain controller or an enterprise network, the cellular broadcast message.

EXAMPLE EMBODIMENTS

Public Warning Systems, while helpful, have their limitations in that they cannot reach a wider population. For example, MNOs do not have one hundred percent coverage, i.e., the ability to provide network connectivity everywhere. Each MNO may have dead zones in which network coverage cannot be provided to the devices or the provided signal is just too weak. If a device is outside the coverage area of the MNO (in a dead zone), the device will not receive a warning message notification and the user will not be warned. Dead zones are common in buildings, basements, elevators, or other locations obstructed by various obstacles such as a tree, a mountain, and so on. In the embodiments described herein, and in an effort to extend receipt of a warning message, a warning message notification is extended to other communication technologies such as access networks and enterprise communication tools.

Many enterprises are adopting private Long Term Evolution (LTE) networks and private $5^{th}$ generation (5G) cellular networks. With these networks, users, e.g., inside buildings, may latch onto the private LTE network and/or to a Wi-Fi network, instead of, or in addition to, an MNO.

Enterprises use various communication applications: such as IP phones, instant messengers, meeting corroboration applications, and so on. In an example embodiment, PWS messages or notifications are delivered over these enterprise communication applications to the enterprise users using the private LTE network, the Wi-Fi network, or other enterprise communication tools or channels. That is, the PWS messages are transmitted or delivered to the enterprise users connected to the private LTE and Wi-Fi access networks on various enterprise communication tools or enterprise devices including various communication applications such as IP phones, instant messengers (jabber), and team collaboration applications (Teams).

FIG. 1 is a block diagram illustrating an environment 100 in which cell broadcast notifications are provided to a private radio network, according to an example embodiment. The environment 100 includes a user equipment device (UE) 102, a Spectrum Access System (SAS) 104, a private LTE network 110, an EPC 120, and an IP network 130.

The UE 102 may be, but is not limited to, a mobile device, a mobile terminal or station, an internet of things (IoT) device, a consumer device such as a personal digital assistant (PDA) or a smart phone, a personal computer such as a notebook or a desktop computer. The IoT device may include communication equipment, smart appliances, commercial security systems, industrial systems, and so on. While only one UE 102 is depicted in FIG. 1, one of ordinary skill in the art would readily appreciate that different numbers of UEs may be present in the environment 100 depending on a particular configuration.

The UE 102 is connected to public network(s) such as Internet (IP network 130) via various radio access networks such as Wi-Fi™ wireless local area networks (WLANs) and wireless wide area networks (WWANs), such as cellular networks (e.g., $3^{rd}$ generation (3G) networks, $4^{th}$ generation (4G) and $5^{th}$ generation (5G) networks).

In FIG. 1, the UE 102 is connected to the IP network 130 via a core network, the Embedded Packet Core (EPC) 120, over a private radio network such as private LTE network 110. The private LTE network 110 may use a Citizens Broadband Radio Service (CBRS). The CBRS is a 150 MHz wide broadcast band of the 3.5 GHz band (3550 MHz to 3700 MHz) in the United States. Some of this spectrum is used by the United States government for radar systems but is also available for others when not needed. The Federal Communications Commission (FCC) established rules for commercial use of this band. Wireless carriers using CBRS are able to deploy 5G mobile networks without having to acquire spectrum licenses. That is, the CBRS is a band that is allocated by FCC for private use. There are specific rules that devices operating in this band have to confirm to. The SAS is a function that grants the spectrum resources.

The private LTE network 110 further includes a number of base stations such as CBRS devices (CBSDs 112) to the EPC 120. The CBSDs 112 register with the SAS 104 and provide its location information, e.g., geographic location (GPS coordinates that may be statically provided). The SAS 104 stores the location information for each of the CBSDs 112. The CBSDs 112 may be an evolved nodes (eNode).

In FIG. 1, the EPC 120 includes a user plane composed of servicing gateways and a control plane having various servers and databases. The servicing gateways transport IP traffic between the UE 102 and an external network (the IP network 130). The servicing gateways include a serving gateway (S-GW 122) and a packet data network gateway (P-GW 124). The control plane includes a Home Subscriber Server (HSS 126) and a Mobility Management Entity (MME 128). The HSS is a database that contains user-related and subscriber-related information. It also provides support functions in mobility management, call and session setup, user authentication and access authorization. The MME 128 handles signaling related to mobility and security. The MME 128 also tracks the UE 102 in an idle-mode. It is a termination point of the Non-Access Stratum (NAS). In FIG. 1, solid arrows indicate the flow of user traffic and dotted arrows indicate the flow of control traffic.

In FIG. 1, the SAS 104 interfaces with a PWS notification provider (not shown in FIG. 1, but shown in FIG. 2) to obtain a PWS notification 142 and distributes the PWS notification 142 to an appropriate one of the CBSDs 112 based on location information provided in the PWS notification and based on location information of the CBSDs 112 available to the SAS 104, explained in further detail below with reference to FIG. 2. Each of the CBSDs 112 that receives the PWS notification notifies the UEs (the UE 102) attached to it.

Figure 2:
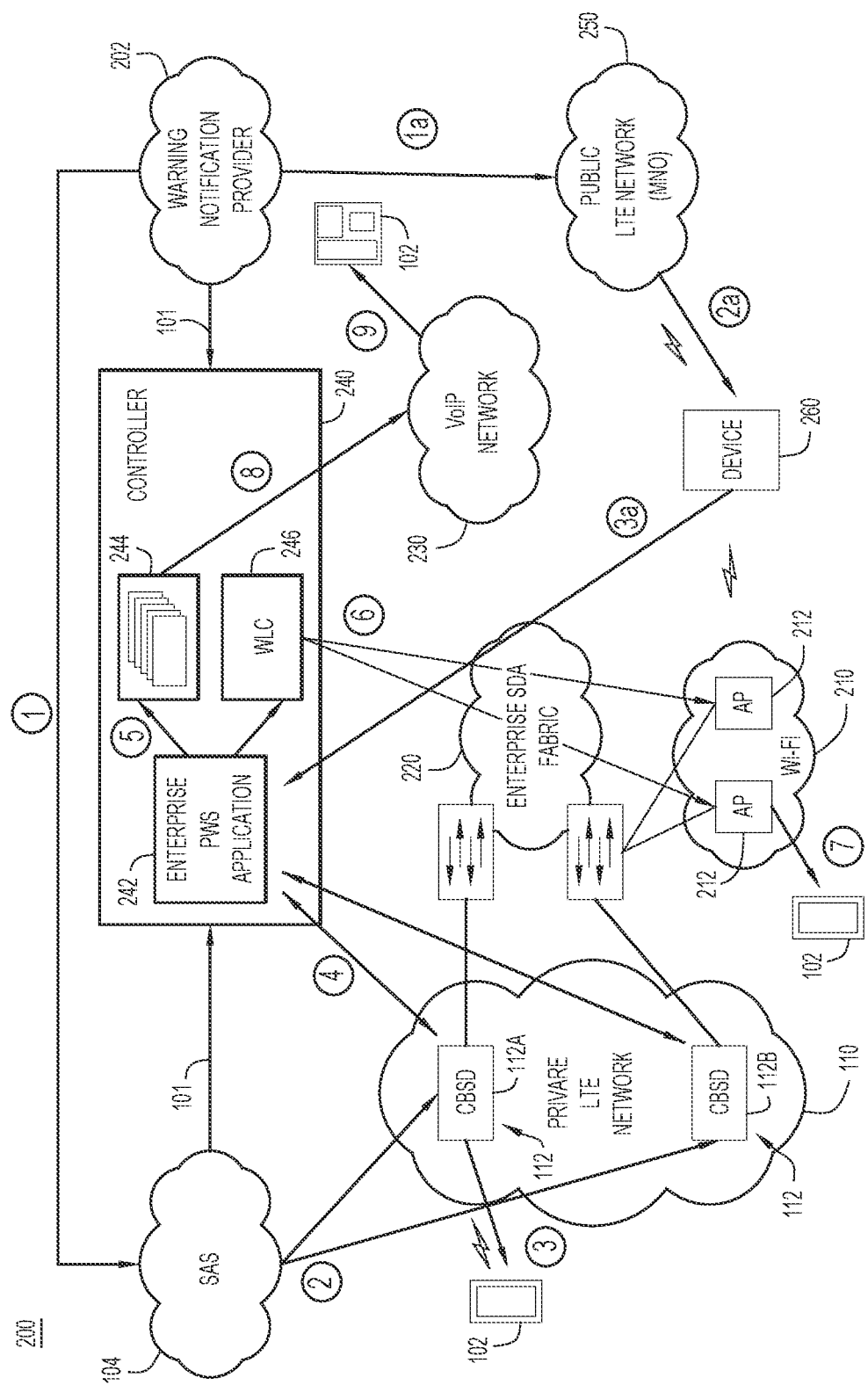
FIG. 2 is a block diagram illustrating a network architecture for extending cell broadcast notifications to other access or communication technologies, according to an example embodiment.

FIG. 2 is a block diagram illustrating a network architecture 200 for extending cell broadcast notifications to other access or communication technologies, according to an example embodiment.

The network architecture 200 includes a warning notification provider 202, a number of UEs (the UE 102), the SAS 104, the private LTE network 110 with the CBSDs 112 (individually labeled as a first CBSD 112(1) and a second CBSD 112(2)). The network architecture 200 further includes a Wi-Fi network 210 having access point devices (APs) 212, an enterprise software defined access (SDA) fabric 220, a voice over IP (VoIP) network 230, and a controller 240. The network architecture 200 also includes a public LTE network 250 of a mobile network operation (MNO) (a cellular network) and a device 260.

The controller 240 includes an enterprise PWS application 242, enterprise communication tools 244, and a wireless local access network (LAN) controller (WLC 246). The controller 240 may be a data network architecture (DNA) controller or an SDA controller. The controller 240 may include one or more processors and/or computers.

In FIG. 2, at operation 1, the warning notification provider 202 sends a notification to the SAS 104. The notification is a PWS message from the warning notification provider 202 and includes information such as {Event Description, Area Affected, Recommended Action, Expiration Time (with time zone), Sending Agency}, and any additional fields. The event description field describes the disaster or an emergency event that has occurred or is about to occur such as an earthquake or a tsunami. The area affected field indicates geo-location coordinates affected by the disaster (for example, GPS coordinates defining an area impacted by the event). The recommended action field indicates proposed actions to be taken by the MNO or a private LTE network. For example, the recommended action field may indicate a required additional resources (type and quantity) or indicate a priority of certain ones of the UEs 102 such as devices that have been registered as first responder or emergency vehicle devices. The expiration time field may indicate estimated duration of the event (e.g., two hours, thirty minutes, and twenty seconds) or may indicate a particular point in time (e.g., event expires at 2:30 pm EST). The sending agency field indicates the agency that issued the warning e.g., weather center.

The SAS 104 maintains a list of CBSDs 112 that are currently registered and that are currently active. That is, during the registration process with the SAS 104, each of the CBSDs 112 provides attribute information which includes its fixed location information, a set of unique identifiers (e.g., owner information, device information), a group membership, and radio-related capabilities. The SAS 104 stores the attribute information received from the CBSDs 112 and builds a geo-location map for each of the CBSDs 112. A successful registration procedure with the SAS 104 concludes with the SAS 104 providing a unique identifier to each respective one of the CBSDs 112.

Based on receiving this notification or PWS message, the SAS 104 parses the Area-affected field of the notification message received in operation 1 to obtain the location or geographic coordinates of the impacted area. Based on the obtained location, the SAS 104 identifies each impacted CBSD from the CBSDs 112. For example, the SAS 104 compares the location of the impacted area and the geo map of the CBSDs 112 to identify the impacted CBSDs that have been registered and are currently active. At a high level, the following criteria {Message.Location=CBSD.Location} is applied for selecting an impacted CBSD.

In FIG. 2, the SAS 104 identifies the first CBSD 112(1) and the second CBSD 112(2) as operating in the impacted area. As such, in operation 2, the SAS 104 relays the notification or the PWS message to the impacted first CBSD 112(1) and the impacted second CBSD 112(2) (the CBSDs 112). In one example embodiment, in addition to or as an alternative, the SAS 104 may relay the notification or the PWS message to an enterprise domain-proxy (not shown) in which case the enterprise domain-proxy redistributes the PWS message to each identified CBSD based on location information. The SAS 104 may relay the PWS message over a secure connection (transport layer security (TLS) connection). In an example embodiment, instead of communicating with the CBSDs 112 using the EPC 120, the SAS 104 may establish a direct and secure TLS interface or connection with the identified CBSDs 112, and may then relay the PWS messages directly to these identified CBSDs 112. The PWS message is intended for the UE 102 but is relayed directly from the SAS 104 to the identified CBSDs 112. In another example embodiment, the SAS 104 may determine that only the first CBSD 112(1) is impacted and, thus, relays the PWS message to only the first CBSD 112(1) and not the second CBSD 112(2). In other words, each CBSD is selected based on determining whether it operates in the affected area specified in the PWS message.

In operation 3, the PWS message is further distributed or broadcasted to the UE 102 attached thereto. That is, the CBSDs 112 notifies users (via UEs) attached to its cell. In one example embodiment, in case of neutral host network (NHN) environments, the message will be relayed to all participating service providers (tenants) connected through those cells.

At operation 4, the CBSDs 112 also notify the controller 240. In an example embodiment, a secure TLS interface or a secure TLS connection is established between the CBSDs 112 in the enterprise and an enterprise application executed by the controller 240. That is, the controller 240 executes an enterprise PWS application 242, which receives the PWS message from the CBSDs 112. The enterprise PWS application 242 interfaces with other enterprise communication systems or enterprise communication tools 244 and/or with the WLC 246, at operation 5.

For example, in FIG. 2, the enterprise PWS application 242 notifies the WLC 246 at operation 5, which then relays the PWS message to one or more of the APs 212 via an enterprise SDA fabric 220, at operation 6. As shown in FIG. 2, the enterprise PWS application 242 identifies one or more of the APs 212 to which the PWS message should be provided based on the location information. The enterprise PWS application 242 matches a location of one of the CBSDs 112 that provided the PWS message with the location of one of the APs 212 in the Wi-Fi network 210 {CBSD.Location=WiFI-APLocation}. The PWS message is then sent to an identified Wi-Fi AP of the APs 212, which in turn broadcasts the PWS message to all attached UEs including the UE 102. At operation 7, one of the APs 212 (identified by the WLC 246) provides the PWS message to the UE 102 attached to the Wi-Fi network 210 via one this one AP.

In one example embodiment, the UE 102 may be compatible with the PWS system, i.e., a PWS-UE as defined in 3$^{rd}$ Generation Partnership Project Technical Specification § 22.268. The PWS-UE receives the PWS messages over the Wi-Fi access. This is provided by way of an example and not by way of a limitation. Other enterprise networks are within the scope of various example embodiments.

In FIG. 2, it is also shown that the PWS message may be relayed from the controller 240 to other communication systems such as VoIP network 230 using various ones of the enterprise communication tools 244. That is, the enterprise PWS application 242 provides the PWS message to one or more of the enterprise communication tools 244, which then relays the PWS message to the UE 102 connected to a respective enterprise communication tool. The enterprise communication tools 244 include but are not limited to IP phones, Jabber, and Session Initiation Protocol (SIP) infrastructure such as Teams application. As shown in FIG. 2, one of the enterprise communication tools 244 is a VoIP application, which relays the PWS message to UE 102 (an IP phone) via the VoIP network 230, in operations 8 and 9. That is, the enterprise PWS application 242 relays the PWS message to an Enterprise SIP Proxy, a WebEx Server, a Teams application, and/or other enterprise applications. The protocols used in these communication applications or systems leverage the respective notification capability for delivering this PWS message to the UE 102. For example, a user of an IP phone may view this PWS message on a console screen and/or the PWS message may also be translated into audio and played during a live teleconference (in substantially real-time). In all these examples, the location of the subscriber's attachment point is used in a location determination.

In an example embodiment explained above, when there is a PWS message from the SAS 104, an impacted CBSD relays the PWS message to the enterprise PWS application 242.

According to another example, at 101, the warning notification provider 202 may provide the notification to the SAS 104 via the controller 240, at 101. According to yet another example embodiment, the warning notification provider 202 may provide the notification to the controller 240, at 101 and the controller 240 determines the impacted CBSDs 112 and relays the notification or the PWS message to the impacted first CBSD 112(1) and the impacted second CBSD 112(2) (the CBSDs 112), at operation 4. The CBSDs 112 would then relay the message to the users (via UEs) attached to its cell, at operation 3.

According to another example embodiment, the PWS messages may be delivered by other means to the enterprise PWS application 242 and the UE 102 attached to the private LTE network 110. For example, the warning notification provider 202 generates the PWS message and transmits the PWS message via a cellular network, e.g., the public LTE network 250 operated by an MNO, shown as operation 1a in FIG. 2. At operation 2a, the PWS message is received by a device 260 (e.g., a mobile device deployed for sensing such messages, among other possible functions). At operation 3a, the PWS message is provided by the device 260 to the enterprise PWS application 242 in the controller 240 using the enterprise SDA fabric 220.

A secure TLS interface or a secure TLS connection may be provided between every device 260 in the enterprise and the enterprise PWS application 242 for relaying the PWS messages. The enterprise PWS application 242 may then distribute the PWS message via other access communication networks (including the CBSDs 112) and via the enterprise communication tools 244, as detailed above with reference to operations 5-9. In this example configuration, the PWS message is delivered to the enterprise PWS application 242 via the device 260, and the message is then relayed from the enterprise PWS application 242 to the private LTE network 110, the Wi-Fi network 210, and/or other enterprise communication tools 244.

One example of the device 260 is a dedicated, active, wireless network sensor designed for assuring optimal performance across the network. According to an example embodiment, the device 260 may assure optimal performance of a wireless network such as a cellular network (the public LTE network 250), a Wi-Fi network, or an Ethernet enabled network.

The device 260 may be equipped with LTE capabilities. In an example embodiment, the device 260 is further configured with relay capabilities. A PWS message received over the macro-cell network (the public LTE network 250) may be relayed over the Wi-Fi network 210 to the enterprise PWS application 242. According to an example embodiment, an enterprise can deploy the device 260 in locations where there is macro-network (the public LTE network 250) and the Wi-Fi coverage (the Wi-Fi network 210). The device 260 may be fixed to a wall and connect to both networks.

In an example embodiment, when a PWS message from the macro network (the public LTE network 250) is sensed by the device 260, it relays this PWS message to an enterprise PWS application 242 over a secure channel or connection. As an alternative or in addition, the device 260 may relay the PWS message to the Wi-Fi network 210 that provides the PWS message to the UE 102 attached thereto based on the location of the access point corresponding to the location information provided in the PWS message and/or the location of the device 260.

In an example embodiment, where there is no SAS 104 for PWS support, the enterprise PWS application 242 may relay the PWS message (received from the device 260) to the CBSDs 112 based on the location information and the CBSDs 112 may in turn broadcast the PWS message to all private LTE devices (such as the UE 102) attached thereto.

According to various example embodiments, the always-ON SAS interface between the SAS 104 and the CBSDs 112 in the enterprise are used to deliver PWS messages. Based on the location element of the CBSD attribute information provided during registration with the SAS, SAS can determine whether a respective CBSD is a target receiver.

According to various example embodiments, active devices or sensors or enterprise devices are configured with a new capability of relaying the PWS messages, thereby extending the PWS message to enterprise applications and an enterprise communication infrastructure.

According to various example embodiment, a standard PWS compatible UE is able to receive the PWS messages over a private LTE or Wi-Fi access network. Further, the PWS message is extended to reach the private LTE users, who are not using MNO service, or are in the macro-network coverage, or are not in the macro-network coverage depending on a particular configuration. Also, the PWS messages are extended to reach Wi-Fi users that attach to the enterprise Wi-Fi network. Further, using the controller 240, the PWS messages are relayed to various communication tools including IP Phones, Jabbers, Teams, instant messengers, collaboration applications, and other communication tools.

Example embodiments extend PWS messages to enterprise users connected via various private access networks (private LTE access network and Wi-Fi access network) and various enterprise communication tools (IP Phones, Jabber and Teams). Accordingly, the PWS alert messages are extended to reach a wider enterprise population by using a SAS-CSBD interface and dual LTE/Wi-Fi devices for receiving the PWS messages. Additionally, the PWS message sources are connected to the controller 240, which allows the PWS messages to be relayed to other wireless devices in the notification area. The geo-location map of the CBSD devices that SAS maintains is used to determine a target list of devices for message delivery.

Figure 3:
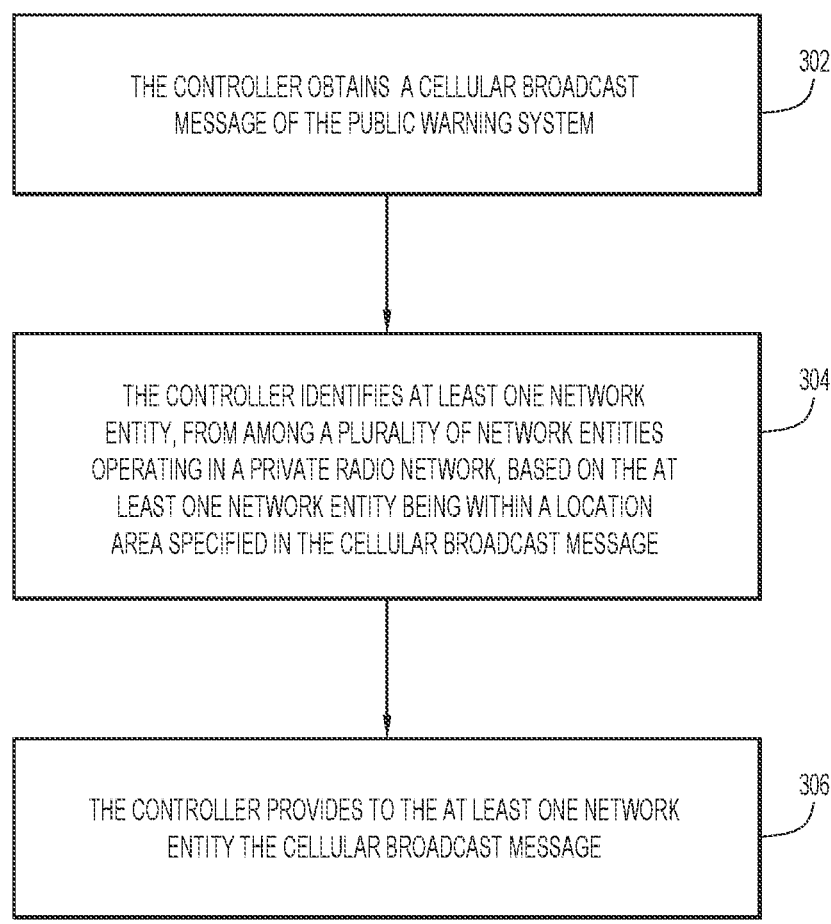
FIG. 3 is a flowchart illustrating a method of providing a cell broadcast notification via a private radio network, according to an example embodiment.

FIG. 3 is a flowchart illustrating a method 300 of providing a cell broadcast notification via a private radio network, according to an example embodiment. The method 300 is performed by a controller such as the SAS 104 depicted in FIGS. 1 and 2 or a controller 240 depicted in FIG. 2 or a combination of the two entities. In an example embodiment, the operations are performed by an entity that receives the notification and interfaces with the SAS 104 for relaying the notification to the CBSDs 112.

At 302, the controller obtains a cellular broadcast message of a public warning system. At 304, the controller identifies at least one network entity from among a plurality of network entities operating in a private radio network. The controller identifies at least one network entity based on the at least one network entity being within a location area specified in the cellular broadcast message. At 306, the controller provides, to the at least one network entity, the cellular broadcast message.

According to one or more example embodiments, the providing operation 306 includes the controller forwarding, to the at least one network entity, the cellular broadcast message via an enterprise domain proxy. The cellular broadcast message is an emergency alert notification generated by the public warning system and broadcasted over a cellular network.

According to one or more example embodiments, providing operation 306 may include enabling a spectrum controller to provide the cellular broadcast message to at least one access point operating in the private radio network. The at least one access point provides at least one user equipment device attached thereto with access to the private radio network.

According to one or more example embodiments, the identifying operation 304 includes the controller parsing the cellular broadcast message to obtain the location area and comparing the location area specified in the cellular broadcast message with a geographic location of each of the plurality of network entities. The plurality of network entities includes network access devices that provide at least one user equipment device attached thereto with access to the private radio network. The identifying operation 304 further includes identifying the respective network entity as the at least one network entity based on the geographic location of a respective network entity determined to be within the location area specified in the cellular broadcast message.

According to one or more example embodiments, the method 300 further includes the controller obtaining attribute information of each of the plurality of network entities during a registration process. The attribute information includes geographic location of a respective network entity. The method further includes the controller allocating, to the private radio network, at least one frequency band and providing the at least one frequency band to the plurality of network entities in the private radio network, during the registration process.

According to one or more example embodiments, the controller is a spectrum access system controller that allocates at least one frequency band to the private radio network. The plurality of network entities includes access points that provide at least one user equipment device with access to the private radio network.

According to one or more example embodiments, the private radio network is a citizen broadband radio service (CBRS) network. The plurality of network entities includes CBRS devices (CBSDs). Each of these CBSDs is configured to propagate the cellular broadcast message to at least one user equipment device attached thereto.

According to one or more example embodiments, the method 300 further includes the controller establishing with the at least one network entity, a secure connection. The at least one network entity includes an access point and the cellular broadcast message is directly provided, by the controller to the access point, via the secure connection.

Figure 4:
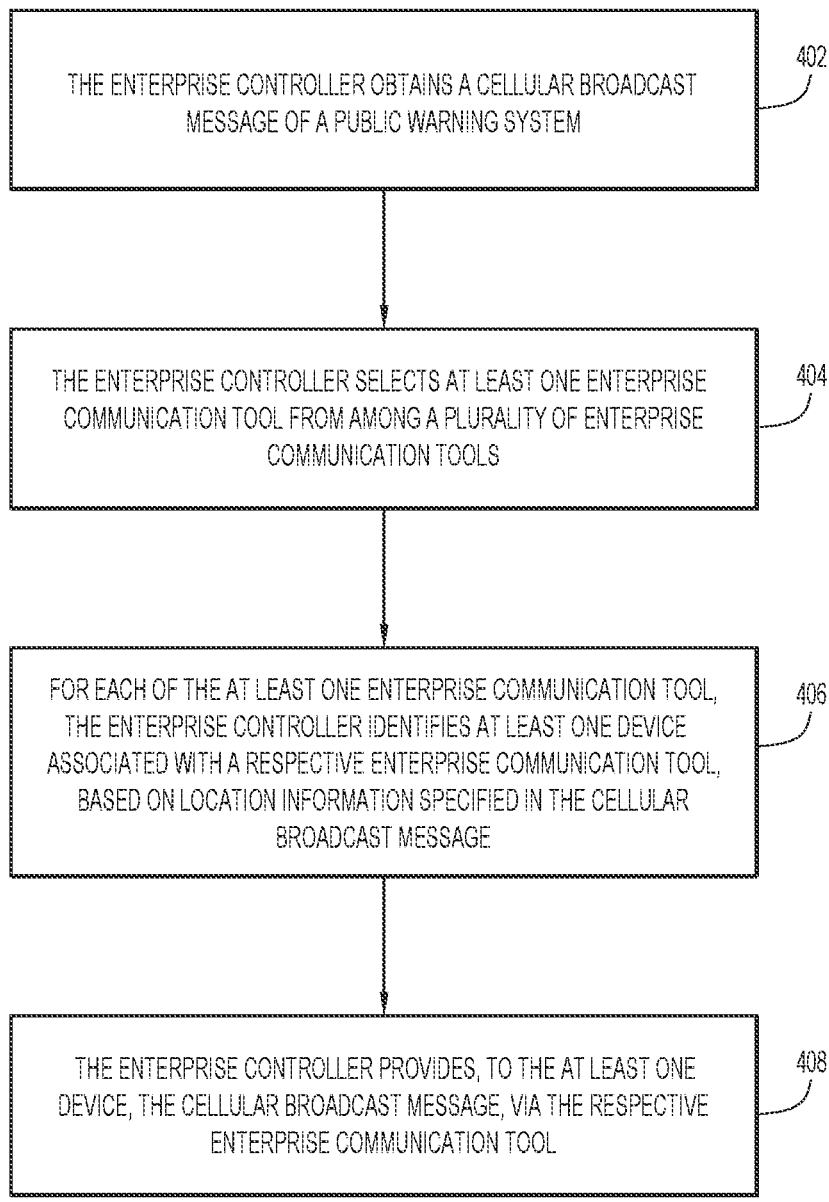
FIG. 4 is a flowchart illustrating a method of providing a cell broadcast notification via one or more of enterprise communication tools, according to an example embodiment.

FIG. 4 is a flowchart illustrating a method 400 of providing a cell broadcast notification via one or more of enterprise communication tools, according to an example embodiment. The method 400 may be performed by an enterprise controller such as the controller 240 depicted in FIG. 2.

At 402, the enterprise controller obtains a cellular broadcast message of a public warning system. At 404, the enterprise controller selects at least one enterprise communication tool from among a plurality of enterprise communication tools. At 406, for each of the at least one enterprise communication tool, the enterprise controller identifies at least one device associated with a respective enterprise communication tool, based on location information specified in the cellular broadcast message. At 408, the enterprise controller provides, to the at least one device, the cellular broadcast message, via the respective enterprise communication tool.

According to one or more example embodiments, the obtaining operation 402 includes the enterprise controller obtaining, from an access point of a private radio network, the cellular broadcast message of the public warning system. The cellular broadcast message may be an emergency alert notification generated by the public warning system.

According to one or more example embodiments, the obtaining operation 402 includes the enterprise controller obtaining from a device that measures performance of a radio network, the cellular broadcast message. The cellular broadcast message may be an emergency alert notification generated by the public warning system.

According to one or more example embodiments, the selecting operation 404 includes the enterprise controller selecting the at least one enterprise communication tool from among a voice over Internet Protocol (VoIP) telephone application, an instant messaging application, and an online meeting or collaboration application.

According to one or more example embodiments, the identifying operation 406 includes determining, by the respective communication tool, at least one device that is within a location area specified in the cellular broadcast message. The at least one device includes a user equipment device connected to the respective enterprise communication tool.

According to one or more example embodiments, the selecting operation 404 includes the enterprise controller selecting a wireless local access network (WLAN) as the at least one enterprise communication tool.

According to one or more example embodiments, the identifying operation 406 includes determining, by a WLAN controller of the enterprise controller, at least one access point of the WLAN that is within a geographic area determined based on the location information specified in the cellular broadcast message.

According to one or more example embodiments, the selecting operation 404 includes the enterprise controller selecting at least one access point of a private radio network as the at least one enterprise communication tool such that the cellular broadcast message is relayed by the at least one access point to at least one user equipment device attached thereto.

Figure 5:
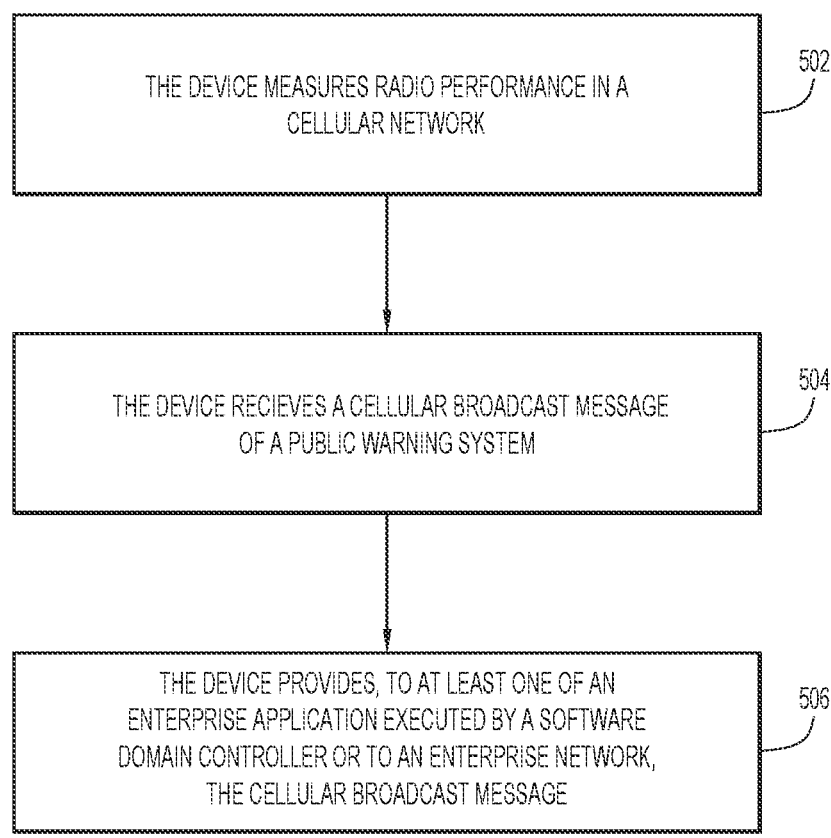
FIG. 5 is a flowchart illustrating a method of providing a cell broadcast notification by a device operating in an enterprise network, according to an example embodiment.

FIG. 5 is a flowchart illustrating a method 500 of providing a cell broadcast notification by a device operating in an enterprise network, according to an example embodiment. The method 500 is implemented by a device such as the device 260 in FIG. 2.

At 502, the device measures radio performance in a cellular network. At 504, the device receives a cellular broadcast message of a public warning system and at 506, the device provides to at least one of an enterprise application executed by a software domain controller or an enterprise network, the cellular broadcast message.

According to one or more example embodiments, the providing operation 506 includes the device providing, to an access point, the cellular broadcast message. The access point is located in a vicinity of the device of the enterprise network that is a wireless local access network (WLAN).

According to one or more example embodiments, the providing operation 506 includes the device providing to the enterprise application, the cellular broadcast message. The enterprise application identifies at least one enterprise communication application and relays the cellular broadcast message to at least one user equipment device connected to the at least one enterprise communication application.

According to one or more example embodiments, the cellular broadcast message is an emergency alert notification generated by the public warning system and broadcasted over a cellular network.

Yet in another example embodiment, a method is provided in which an access point of a private radio network obtains from a spectrum access system (SAS) controller, a cellular broadcast message of a public warning system. A location of the access point corresponds to an affected area specified in the cellular broadcast message. The method further includes the access point providing the cellular broadcast message to at least one of a plurality of user equipment devices attached to the access point.

According to one or more example embodiments, the obtaining operation includes directly obtaining, by the access device from the SAS, the cellular broadcast message without involving EPC. The access point is selected by the SAS controller from among a plurality of access points operating in the private radio network based on matching the location of the access point to the affected area specified in the cellular broadcast message.

According to one or more example embodiments, the obtaining operation includes obtaining, by the access point from the SAS controller via an enterprise domain proxy, the cellular broadcast message that is an emergency alert notification issued by the public warning system.

Figure 6:
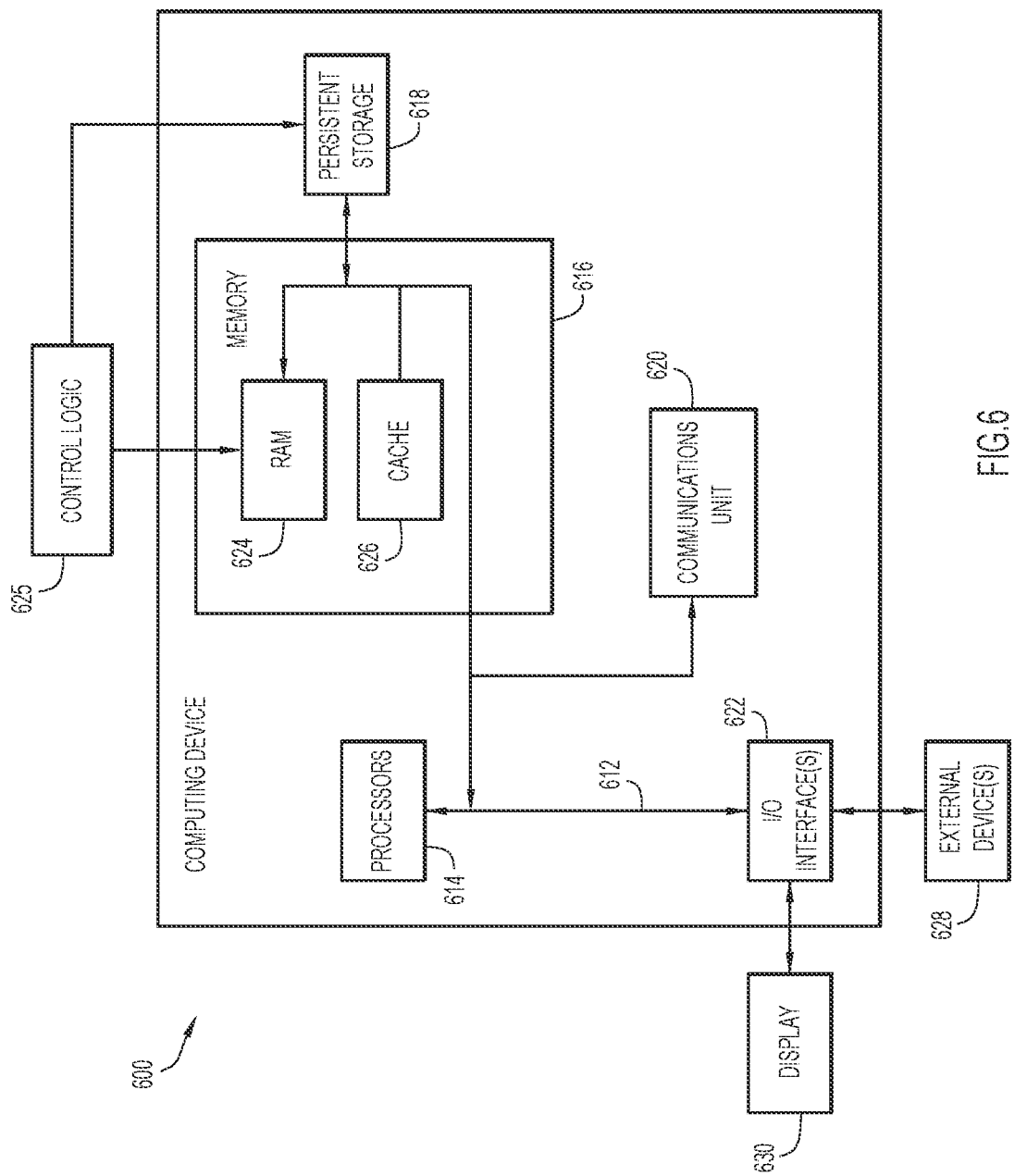
FIG. 6 is a hardware block diagram of a computing device configured to provide cell broadcast notification on another communication or access network, according to various example embodiments.

FIG. 6 is a hardware block diagram illustrating a computing device 600 that may perform the functions of any of the servers or computing or control entities referred to herein in connection with FIGS. 1-5. That is the computing device 600 may perform the functions of a spectrum controller e.g., the SAS 104 of FIGS. 1-3 or the functions of an enterprise controller e.g., the controller 240 of FIGS. 2 and 4, or the functions of the device 260 of FIGS. 2 and 5.

It should be appreciated that FIG. 6 provides only an illustration of one embodiment and does not imply any limitations with regard to the environments in which different embodiments may be implemented. Many modifications to the depicted environment may be made.

As depicted, the computing device 600 includes a bus 612, which provides communications between computer processor(s) 614, memory 616, persistent storage 618, communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media. Instructions for the control logic 625 may be stored in memory 616 or persistent storage 618 for execution by processor(s) 614.

The control logic 625 includes instructions that, when executed by the computer processor(s) 614, cause the computing device 600 to perform one or more of the methods described herein including a method of providing the cellular broadcast message to at least one network entity in a private radio network when the computing device 600 is a controller (e.g. the SAS 104 or the controller 240), a method of providing the cellular broadcast message to at least one device associated with a respective enterprise communication tool when the computing device 600 is an enterprise controller (e.g., the controller 240), a method of providing to an enterprise application executed by a software domain controller or to an enterprise network, the cellular broadcast message when the computing device 600 is a device (e.g., the device 260). The control logic 625 may be stored in the memory 616 or the persistent storage 618 for execution by the computer processor(s) 614.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

[ow] I/O interface(s) 622 allows for input and output of data with other devices that may be connected to computing device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

In still another example embodiment, an apparatus is a controller such as the SAS 104 of FIGS. 1-3 or the controller 240 of FIGS. 2 and 3. The apparatus includes a communication interface configured to enable network communications, a memory configured to store executable instructions, and a processor coupled to the communication interface and the memory. The processor is configured to perform operations that include obtaining a cellular broadcast message of a public warning system, identifying at least one network entity, from among a plurality of network entities operating in a private radio network, based on the at least one network entity being within a location area specified in the cellular broadcast message, and providing, to the at least one network entity, the cellular broadcast message.

In yet another example embodiment, an apparatus is an enterprise controller such as the controller 240 of FIGS. 2 and 4. The apparatus includes a communication interface configured to enable network communications, a memory configured to store executable instructions, and a processor coupled to the communication interface and the memory. The processor is configured to perform operations that include obtaining a cellular broadcast message of a public warning system, selecting at least one enterprise communication tool from among a plurality of enterprise communication tools. The operations further include, for each of the at least one enterprise communication tool, identifying at least one device associated with a respective enterprise communication tool, based on location information specified in the cellular broadcast message and providing to the at least one device, the cellular broadcast message, via the respective enterprise communication tool.

In yet another example embodiment, an apparatus is the device 260 of FIGS. 2 and 5. The apparatus includes a communication interface configured to enable network communications, a memory configured to store executable instructions, and a processor coupled to the communication interface and the memory. The processor is configured to perform operations that include obtaining measurements of radio performance in a cellular network, receiving a cellular broadcast message of a public warning system, and providing to at least one of an enterprise application executed by a software domain controller or an enterprise network, the cellular broadcast message.

In yet other example embodiments, one or more non-transitory computer readable storage media encoded with instructions are provided. When the media is executed by the processor, the instructions cause the processor to perform any of the operations described above with reference to FIGS. 3-5. That is, the methods of FIGS. 3-5 can be embodied on the one or more non-transitory computer readable storage media.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, virtual private network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, an apparatus, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    obtaining, by a spectrum access system (SAS) that grants citizen broadband radio service (CBRS) network spectrum to wireless carriers that operate CBRS devices, a cellular broadcast message of a public warning system;
    identifying, by the SAS, at least one CBRS device, from among a plurality of CBRS devices operating in a private radio network, based on the at least one CBRS device being within a location area specified in the cellular broadcast message;
    providing, by the SAS to the at least one CBRS device, the cellular broadcast message; and
    forwarding, by the at least one CBRS device, the cellular broadcast message to an enterprise controller that further distributes the cellular broadcast message to access points of a wireless local area network that is separate from the private radio network in which the CBRS devices operate, wherein the access points to which the cellular broadcast message is distributed are selected based on a match between a location of the access points and a location of the at least one CBRS device forwarding the cellular broadcast message.

2. The method of claim 1, wherein identifying the at least one CBRS device, from among the plurality of CBRS devices in the private radio network includes:
    parsing, by the SAS, the cellular broadcast message to obtain the location area;
    comparing, by the SAS, the location area specified in the cellular broadcast message with a geographic location of each of the plurality of CBRS devices; and
    based on the geographic location of a respective CBRS device determined to be within the location area specified in the cellular broadcast message, identifying the respective CBRS device as the at least one CBRS device.

3. The method of claim 1, further comprising:
    obtaining, by the SAS, attribute information of each of the plurality of CBRS devices during a registration process, wherein the attribute information includes geographic location of a respective CBRS device;
    allocating, by the SAS to the private radio network, at least one frequency band; and
    providing, by the SAS, the at least one frequency band to the plurality of CBRS devices in the private radio network, during the registration process.

4. An apparatus, comprising:
    a network interface card configured to enable communications via a network;
    a memory configured to store logic instructions; and
    a processor, when executing the logic instructions, configured to:
        operate a spectrum access system (SAS) that grants citizen broadband radio service (CBRS) network spectrum to wireless carriers that operate CBRS devices;
        obtain a cellular broadcast message of a public warning system;
        identify at least one CBRS device, from among a plurality of CBRS devices operating in a private radio network, based on the at least one CBRS device being within a location area specified in the cellular broadcast message;
        provide, to the at least one CBRS device, the cellular broadcast message; and
        cause the at least one CBRS device to forward the cellular broadcast message to an enterprise controller that further distributes the cellular broadcast message to access points of a wireless local area network that is separate from the private radio network in which the CBRS devices operate, wherein the access points to which the cellular broadcast message is distributed are selected based on a match between a location of the access points and a location of the at least one CBRS device forwarding the cellular broadcast message.

5. The apparatus of claim 4, wherein the processor is configured to:
    parse the cellular broadcast message to obtain the location area;
    compare the location area specified in the cellular broadcast message with a geographic location of each of the plurality of CBRS devices; and
    based on the geographic location of a respective CBRS device determined to be within the location area specified in the cellular broadcast message, identify the respective CBRS device as the at least one CBRS device.

6. The apparatus of claim 4, the processor is configured to:
    obtain attribute information of each of the plurality of CBRS devices during a registration process, wherein the attribute information includes geographic location of a respective CBRS device;
    allocate, to the private radio network, at least one frequency band; and
    provide the at least one frequency band to the plurality of CBRS devices in the private radio network, during the registration process.

7. A non-transitory computer readable storage media encoded with instructions that, when executed by a processor, cause the processor to:
    operate a spectrum access system (SAS) that grants citizen broadband radio service (CBRS) network spectrum to wireless carriers that operate CBRS devices;
    obtain a cellular broadcast message of a public warning system;
    identify at least one CBRS device, from among a plurality of CBRS devices operating in a private radio network, based on the at least one CBRS device being within a location area specified in the cellular broadcast message;
    provide, to the at least one CBRS device, the cellular broadcast message; and
    cause the at least one CBRS device to forward the cellular broadcast message to an enterprise controller that further distributes the cellular broadcast message to access points of a wireless local area network that is separate from the private radio network in which the CBRS devices operate, wherein the access points to which the cellular broadcast message is distributed are selected based on a match between a location of the access points and a location of the at least one CBRS device forwarding the cellular broadcast message.

8. The non-transitory computer readable storage media of claim 7, encoded with instructions that, when executed by a processor, cause the processor to:
    parse the cellular broadcast message to obtain the location area;
    compare the location area specified in the cellular broadcast message with a geographic location of each of the plurality of CBRS devices; and
    based on the geographic location of a respective CBRS device determined to be within the location area specified in the cellular broadcast message, identify the respective CBRS device as the at least one CBRS device.

* * * * *